Nov. 22, 1960   J. B. FREED   2,961,214
LINED VALVE
Original Filed June 14, 1954
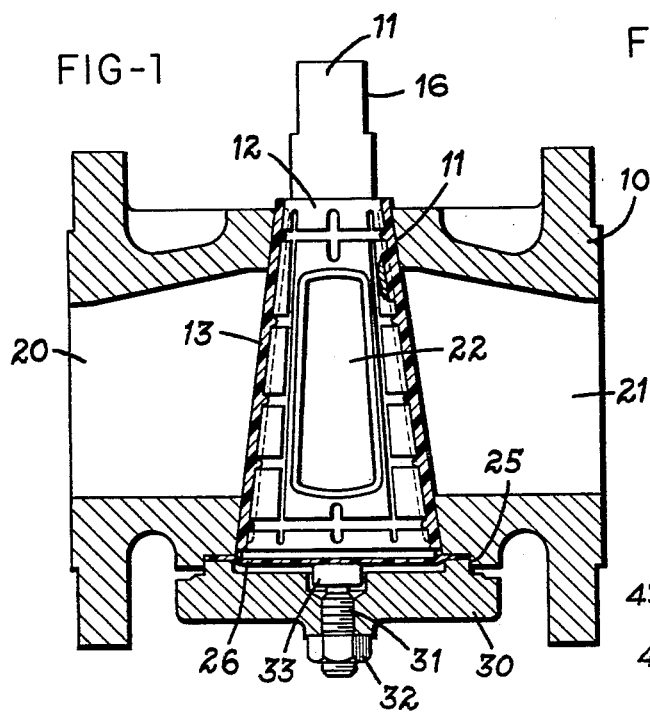
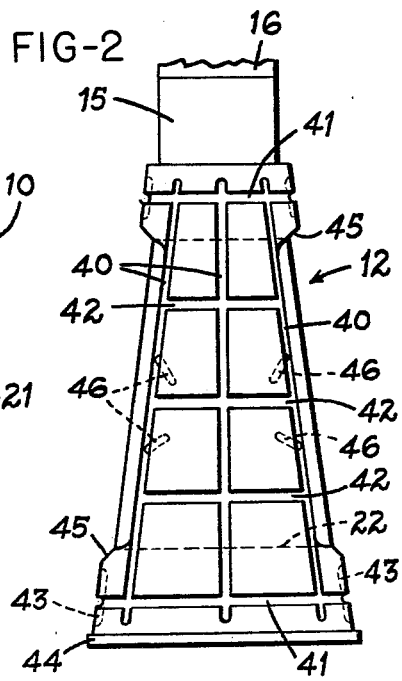
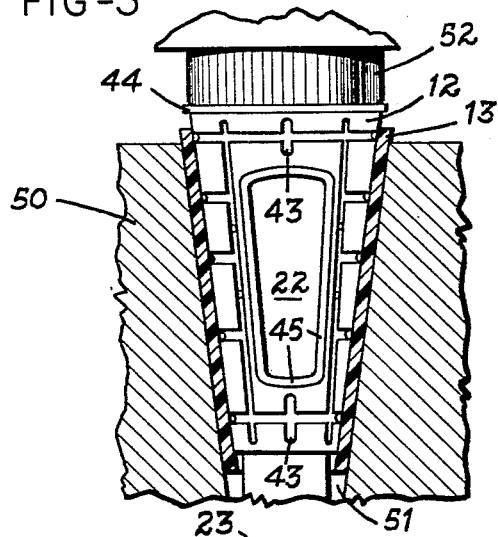
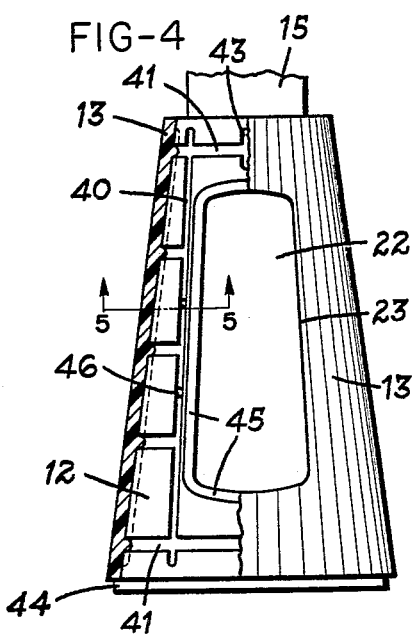
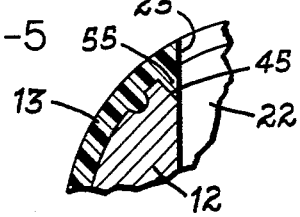
INVENTOR.
JACOB B. FREED
BY
Marechal, Biebel, French & Bugg
ATTORNEYS

United States Patent Office 2,961,214
Patented Nov. 22, 1960

2,961,214

LINED VALVE

Jacob B. Freed, Dayton, Ohio, assignor to The Duriron Company, Inc., Dayton, Ohio, a corporation of New York Continuation of application Ser. No. 436,282, June 14, 1954. This application Dec. 4, 1958, Ser. No. 778,111

8 Claims. (Cl. 251—314)

This invention relates to plug valves, and more particularly to lined valves of the type employed for handling corrosive fluids and the like.

It is the primary object of the invention to provide a lined plug valve of improved and novel characteristics wherein the liner is secured on the plug to turn therewith in the bore in the valve body, and more particularly wherein the valve is so formed and assembled on the plug as in effect to form therewith a single unit which not only assures proper sealing in use but which also is readily fabricated as a unit either for installation in a new valve body or as a replacement unit for an existing valve.

It is also an object of the invention to provide a plug valve as outlined above wherein the plug is formed of metal with indentations in the surface thereof and the liner is formed of a thermoplastic material having a coefficient of thermal expansion substantially greater than that of the plug, and in which the liner is first formed to a smaller size than the plug and is then heated to an elevated temperature with resulting expansion, and the plug is forced into the heated liner under high pressure causing the material of the liner to shrink into the indentations in the plug as the liner cools and thus to lock the liner against both axial and angular movement with respect to the plug.

Further objects and advantages of the invention will be apparent from the following description, the accompanying drawing and the appended claims.

In the drawing:

Fig. 1 is a sectional view through a lined plug valve constructed in accordance with the present invention;

Fig. 2 is a detail elevational view of the unlined plug for the valve of Fig. 1;

Fig. 3 is a sectional view illustrating a step in the assembly of the plug and liner of Figs. 1 and 2;

Fig. 4 is an elevational view, partly broken away, showing the completed plug and liner unit for the valve of Fig. 1; and Fig. 5 is an enlarged fragmentary section on the line 5—5 of Fig. 4.

Referring to the drawing, which illustrates a preferred embodiment of the invention, the valve body 10 in Fig. 1 has a transverse tapered bore 11 for receiving the frusto-conical plug 12 and complementary liner 13. At the upper end of the plug is a stem portion 15 provided with flats 16 on each side thereof for interlocking engagement with an operating handle. The valve body 10 is formed with flow passages 20 and 21 adapted to be connected upon turning of the plug by the transversely extending port 22 in the plug, and the liner 13 is provided with similar ports or flow passages 23.

The lower end of the valve body 10 is provided with an enlarged counterbore 25 to receive a thrust diaphragm 26 and cap 30, which is bolted to the body in the usual way. The cap 30 carries an adjustable stud 31 having a lock nut 32 and engaging a thrust plunger 33 which has direct connection with the thrust diaphragm 26 and through the diaphragm with the large end of the plug 12 to provide for maintaining the desired pressure on the plug and liner in the direction of the small end of the bore 11.

The plug 12 and liner 13 forms a unit, with the liner being secured on the plug against both angular and axial movement with respect to the plug. As shown in Fig. 2, the metallic plug is formed with a plurality of grooves 40 which extend axially over the major portion of the length of its tapered surface. These grooves 40 are connected by circumferential grooves 41 beyond the ends of the port 22 and also by partial circumferentially extending grooves 42 in the side portions of the plug between the two ends of the port. Each groove 41 is also shown as provided with a pair of short connecting axial grooves 43 opposite the port 22. These several grooves are shown as substantially semi-cylindrical in section, and satisfactory resultss have been obtained with a radius of ⅛ inch for each groove in a plug for a 3-inch valve wherein the tapered portion of the plug is approximately 4 inches in length and 3 inches in diameter at its larger end.

The large end of the plug is also shown as having a circumferential shoulder 44 overhanging the adjacent end of the tapered portion of the plug. The plug 12 has a chamfered portion 45 surrounding each end of the port 22 and outlining the port, and in a plug of the above dimensions, satisfactory results are obtained with a ⅛ inch by 45° chamfer. In addition, each of the grooves 40 adjacent the port 22 is shown as provided with a pair of relatively shallow bores 46 extending into the plug at an angle of 45° to the tapered side of the plug and in a direction substantially parallel with the port 22. For example, each of these bores 46 may be ⅛ inch in diameter and ¼ inch in depth.

Fig. 3 shows the assembly of the plug 12 with the liner 13. Cross reference is made to the copending applications of Robert C. Schenck, Serial No. 146,645, filed February 28, 1950 and Serial No. 176,600, filed July 29, 1950, both assigned to the same assignee as this application and both now issued as Patent No. 2,713,987 and No. 2,729,420, respectively. These Schenck patents point out that highly satisfactory results have been obtained in valves of the illustrated type with liners formed of a plastic material from the group consisting of polyethylene and derivatives thereof having relatively high coefficients of thermal expansion such particularly as the polytetrafluoroethylene material commercially available under the name of Teflon. The liner 13 is initially formed as a frustoconical sleeve having the same internal and external tapers as the plug 12 and bore 11 respectively, and this liner is fabricated in the usual manner by molding and sintering the plastic material.

The polyethylene materials of the above type have a substantially greater coefficient of thermal expansion than the metals such as stainless steel commonly used for the plug and body in lined valves, and the liner 13 is accordingly initially made of such smaller dimensions than the plug at room temperature that when the liner is heated to a range at which it is readily deformable, it can be force-fitted into assembled relation on the plug. For example, if the maximum diameter of the tapered part of the plug is 3.0625 inches, the liner may have an inner diameter at its largest end of 2.835 inches and a wall thickness of the order of 0.275 to 0.30 inch. Also, preferred results are obtained in the above example with the liner initially somewhat longer than the tapered portion of the plug, for example about 1.25 inches.

In the next step in the production of the plug and valve unit, the liner is heated as noted to a temperature at which it is readily plastic, and this in the case of the above polyethylene materials will be at a temperature of the order of 700° F. which is substantially the same as the sintering temperature employed in the initial forming of the liner. Then as shown in Fig. 3, the heated liner is immediately inserted in a die 50 having a tapered mold cavity 51 prepared to receive the heated liner snugly therein. More specifically, in the initial forming of the liner, and before it is heated, it is desirably machined to such outer diameter at room temperature that it will expand to substantially the same proportions as the cavity 51 when heated to adequately plastic condition, this expansion in the above specific example being of the order of 3/16 inch.

As soon as the heated liner is inserted in the cavity 51, the plug 12 is inserted in the liner, which may be done with the plug at substantially room temperature. Pressure is then promptly applied to the large end of the plug, represented by the ram 52 in Fig. 3, to force the plug into the liner and to force both the plug and liner into the cavity 51. This pressure should be relatively high, namely of the order of 15 to 30 tons, and this applied pressure is maintained while the liner cools to room temperature. The result is first to force the liner material to flow into and fill the several grooves 40–43, chamfers 45 and bores 46 on the sides of the plug as the liner material is compressed in the cavity under the combined axial and radial pressure effective thereon, and this is true whether or not the plug is provided with the shoulder 44. Then as the liner cools, it shrinks further onto the plug in such manner as to maintain the liner material filling these several indentations in the surface of the plug.

When the liner has thus cooled into axially and angularly interlocked relation with the plug, the liner material is cut away opposite the ends of the plug port 22, but this operation is carried out parallel with the direction of the port so that the liner material remains within the chamfer 45. Thus as shown in Fig. 5, this provides a materially increased wall thickness of the liner material in the portions thereof immediately surrounding the port 22, as indicated at 55, which is highly desirable in order to increase the stiffness of these portions of the liner and thus their resistance against line pressure tending to deflect the liner material away from the plug. The final operation in finishing the plug and liner unit is to machine the outer surface of the liner to the proper configuration to fit the bore 11 in the valve body 10. This reduces the wall thickness of the major part of the liner, which is desirable in use since the tendency of the liner material to cold flow in use decreases with the thickness of the wall section. Satisfactory results have been obtained, for example, with the overall thickness of the liner being of the order of 1/8 inch, and the thickness through the several grooves in the plug body will therefore be approximately 3/16 inch.

When this fabricating operation is completed, the finished plug and valve unit has the characteristics illustrated in Figs. 4 and 5. The liner is locked against both axial and angular movement with respect to the plug by the portions thereof which fill the several indentations in the surface of the plug, and this unit is therefore ready for direct installation in a valve body. In fact, this plug and liner unit is readily applicable to valve bodies originally intended for operation in unlined valves, since it is then necessary only to fabricate the plug initially of sufficiently smaller dimensions than the original plug to allow for the additional thickness of the liner. The resulting unit can even be installed in the field with ease and without requiring special machining or the like, since the liner material is capable of adapting itself to compensate for departures of the plug and bore from the accuracy required in the case of metal to metal contact between the plug and body.

The invention offers desirable features in the use of the finished valve. In particular, the movement of the plug during operation of the valve has a tendency to force the liner material even more tightly into the indentations on the surface of the plug than when the plug is at rest, thus minimizing the possibility of movement of the liner with respect to the plug. This result is also aided by the fact that the liner is essentially in tension on the plug due to shrinkage thereof as it cools during the fabricating operation as described. In addition, with the indentations formed by extended grooves as shown, the stresses on the liner material are distributed over such relatively substantial areas as to minimize the necessity for sheer strength in the liner material. From all these standpoints, the invention offers important practical advantages in both the fabrication and use of lined valves.

This application is a continuation of my application Serial No. 436,282, filed June 14, 1954, and now abandoned, and cross reference is also made to my copending application Serial No. 707,807, filed January 8, 1958 as a division of application Serial No. 436,282.

While the articles herein described constitute preferred embodiments of the invention, it is to be understood that the invention is not limited to these precise articles, and that changes may be made therein without departing from the scope of the invention which is defined in the appended claims.

What is claimed is:

1. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, said plug having multiple indentations in the surface thereof extending both axially and circumferentially thereof, sleeve means forming a tubular liner received in said clearance with the inner and outer surfaces thereof in sealing engagement with said opposed surfaces of said plug and bore respectively and having ports therein matching said plug and body ports, said liner being formed of a thermoplastic material having a coefficient of thermal expansion substantially greater than that of said plug and body, said liner including integral portions received in said indentations in said plug surface and forming a keyed connection locking said plug and said liner against relative movement both angularly and axially thereof to retain said liner ports in alignment with the ends of said port in said plug.

2. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, said plug having multiple indentations in the surface thereof extending both axially and circumferentially thereof, sleeve means forming a tubular liner received in said clearance and having the inner and outer surfaces thereof in sealing engagement with said opposed surfaces of said plug and bore respectively, said liner being formed of a fluorocarbon material having a coefficient of thermal expansion substantially greater than that of said plug and body, said liner including integral portions received in said indentations and forming a keyed connection locking said indented surface and said liner against relative movement both angularly and axially thereof to retain said liner in substantially fixed relation with said ports in said indented surface, said plug surface including a chamfered portion surrounding each port end therein, and said liner having a port therein aligned with each said port in said plug surface and surrounded by an integral rim portion engaged within said chamfered portion of said port.

3. In a lined plug valve including a body having flow passages therethrough and a bore extending transversely thereof, the combination of a tapered valve plug received in said bore and having a port therethrough for alignment with said flow passages, said plug having multiple circumferentially and axially extending grooves in the surface thereof opposed to the surface of said bore, said plug having a chamfered portion surrounding each end of said port, sleeve means forming a tubular liner on said plug having the inner and outer surfaces thereof in sealing engagement with the opposed surfaces of said plug and bore respectively, said liner including integral portions received in said grooves on said plug and forming a keyed connection locking said plug and liner against relative movement both angularly and axially thereof, said liner material also filling said chamfered portion of said plug, and said liner having flow passages therethrough at both ends of said port in said plug and aligned therewith to provide a rim portion of said liner surrounding each end of said port in said chamfered portions of said plug and of correspondingly greater wall thickness.

4. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, one of said opposed surfaces having multiple spaced indentations therein forming pockets in said surface, sleeve means forming a tubular liner received in said clearance with the inner and outer surfaces thereof in sealing engagement with said opposed surfaces of said plug and bore respectively and having ports therein matching said plug and body ports, said liner being formed of a fluorocarbon material having a coefficient of thermal expansion substantially greater than that of said plug and body, said liner including integral portions received in said pockets and forming a keyed connection locking said indented surface and said liner against relative movement both angularly and axially thereof to retain said liner ports in alignment with said ports in said indented surface, and said indentations including grooves extending circumferentially and axially of said indented surface in spaced relation with each said port therein and thereby providing an annular portion of said surface extending continuously around each of said ports whereon the material of said liner is of correspondingly less thickness than the portion of said liner overlying and received in each of said grooves.

5. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, one of said opposed surfaces having multiple spaced indentations therein forming pockets in said surface, sleeve means forming a tubular liner received in said clearance with the inner and outer surfaces thereof in sealing engagement with said opposed surfaces of said plug and bore respectively and having ports therein matching said plug and body ports, said liner being formed of a fluorocarbon material having a coefficient of thermal expansion substantially greater than that of said plug and body, said liner including integral portions received in said pockets and forming a keyed connection locking said indented surface and said liner against relative movement both angularly and axially thereof to retain said liner ports in alignment with said ports in said indented surface, and said pockets including a continuous groove extending around said indented surface adjacent each end thereof and defining a continuous shoulder facing axially in the direction of each said port in said surface from each side thereof for engagement with the material of said liner received in said grooves.

6. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, one of said opposed surfaces having multiple indentations therein, tubular liner means received in said clearance with the inner and outer surfaces thereof in sealing engagement with said opposed surfaces of said plug and bore respectively and having ports therein matching said plug and body ports and including integral portions received in said indentation, said indentations including substantially continuous grooves spaced axially of said indented surface between the ends thereof and said ports and extending circumferentially of said indented surface for cooperation with said portions of said liner means received therein to lock said liner means against axial movement with respect to said indented surface, and others of said indentation occupying areas of said indented surface spaced angularly thereof between said ports and having edge portions which form shoulders extending generally axially of said indented surface for cooperation with said portions of said liner means received therein to lock said liner against angular movement with respect to said indented surface.

7. In a lined plug valve including a metallic body having a bore extending transversely thereof and ports therethrough opening into said bore, the combination of a tapered metallic valve plug received in said bore and having a port therethrough for alignment with said body ports, said plug being of sufficiently smaller radial dimensions than said bore to establish an annular clearance between the opposed surfaces thereof, tubular liner means received in said clearance with the inner and outer surfaces thereof in sealing engagement with said opposed surfaces of said plug and bore respectively, said liner means being formed of a fluorocarbon material having a coefficient of thermal expansion substantially greater than that of said plug and body, one of said opposed surfaces having therein multiple indentations arranged in spaced relation with each said port therein, certain of said indentations being located between said ports and others being located between the ends of said indented surface and said ports, said liner means including integral portions received in said indentations and cooperating with the edges thereof to lock said liner means against both angular and axial movement with respect to said indented surface, said indented surface also including an annular indentation surrounding each said port therein, and said liner means having therein a port aligned with each said port in said indented surface and surrounded by an integral rim portion engaged within the adjacent said annular indentation in said surface.

8. The combination defined in claim 6 wherein said circumferentially extending grooves include edge portions which extend circumferentially around at least a major portion of said indented surface and additional edge portions which extend axially along a minor portion of the axial length of said indented surface and thereby form shoulders cooperating with the adjacent portions of said liner means received in said grooves to lock the ends of said liner means against angular movement with respect to said indented surface.

References Cited in the file of this patent

UNITED STATES PATENTS

| 193,111 | Cleveland | July 17, 1877 |
| 948,075 | Richard | Feb. 1, 1910 |
| 2,571,925 | Mueller | Oct. 16, 1951 |
| 2,713,987 | Schenck | July 26, 1955 |
| 2,728,550 | Sinkler | Dec. 27, 1955 |
| 2,751,930 | Redner | June 26, 1956 |
| 2,815,253 | Spriggs | Dec. 3, 1957 |

FOREIGN PATENTS

| 8,858 | Great Britain | July 22, 1885 |